United States Patent
Ishigaki et al.

(10) Patent No.: US 11,396,572 B2
(45) Date of Patent: Jul. 26, 2022

(54) BLOCK COPOLYMER AND PRODUCTION METHOD FOR BLOCK COPOLYMER

(71) Applicant: DENKA COMPANY LIMITED, Tokyo (JP)

(72) Inventors: Yuhei Ishigaki, Itoigawa (JP); Suguru Onuki, Itoigawa (JP); Shogo Hagiwara, Itoigawa (JP); Uichiro Yamagishi, Itoigawa (JP)

(73) Assignee: Denka Company Limited, Tokyo (JP)

( * ) Notice: Subject to any disclaimer, the term of this patent is extended or adjusted under 35 U.S.C. 154(b) by 261 days.

(21) Appl. No.: 16/634,685

(22) PCT Filed: Jul. 31, 2018

(86) PCT No.: PCT/JP2018/028692
§ 371 (c)(1),
(2) Date: Jan. 28, 2020

(87) PCT Pub. No.: WO2019/026914
PCT Pub. Date: Feb. 7, 2019

(65) Prior Publication Data
US 2020/0207900 A1 Jul. 2, 2020

(30) Foreign Application Priority Data
Jul. 31, 2017 (JP) .............................. JP2017-148286

(51) Int. Cl.
*C08F 236/18* (2006.01)
*C08F 220/14* (2006.01)
*C08F 220/16* (2006.01)
*C08F 293/00* (2006.01)
*B60S 1/38* (2006.01)
*C08F 2/38* (2006.01)
*C08F 20/06* (2006.01)
*C08F 36/18* (2006.01)
*C08L 53/00* (2006.01)
*C08F 20/14* (2006.01)
*C08F 20/16* (2006.01)

(52) U.S. Cl.
CPC ............ *C08F 293/005* (2013.01); *B60S 1/38* (2013.01); *C08F 2/38* (2013.01); *C08F 20/06* (2013.01); *C08F 36/18* (2013.01); *C08L 53/00* (2013.01); *B60S 2001/3829* (2013.01); *C08F 20/14* (2013.01); *C08F 20/16* (2013.01); *C08F 236/18* (2013.01); *C08F 2438/03* (2013.01)

(58) Field of Classification Search
None
See application file for complete search history.

(56) References Cited

U.S. PATENT DOCUMENTS 6,153,705 A 11/2000 Corpart et al.
2009/0036608 A1* 2/2009 Ozoe ...................... C09J 153/02
525/212

FOREIGN PATENT DOCUMENTS

| CN | 101263170 A | 9/2008 |
|---|---|---|
| CN | 102803303 A | 11/2012 |
| CN | 102858820 A | 1/2013 |
| EP | 0421149 A1 | 4/1991 |
| EP | 3656795 A1 | 5/2020 |
| JP | H2-300217 A | 12/1990 |
| JP | H3-212414 A | 9/1991 |
| JP | 2000-515181 A | 11/2000 |
| JP | 2002-500251 A | 1/2002 |
| JP | 2002-508409 A | 3/2002 |
| JP | 2004-530751 A | 10/2004 |
| JP | 2005-513252 A | 5/2005 |
| JP | 2006-143899 A | 6/2006 |
| JP | 2007-039654 A | 2/2007 |

(Continued)

OTHER PUBLICATIONS

Ishigaki et al., "Synthesis of poly(chloroprene)-based block copolymers by RAFT-mediated emulsion polymerization," *J. Polymer*, vol. 140 pp. 198-207 (Feb. 21, 2018).

Moad et al., "Living Radical ollymerization by the RAFT Process—A Second Update," *Aust. J. Chem.*, vol. 62 pp. 1402-1472 (2009).

Roth et al., "Versatile ω-End Group Functionalization of RAFT Polymers Using Functional Methane Thiosulfonates," *Journal of Polymer Science*, Editor Hawker et al. vol. 47 No. 12 pp. 3118-3130 (2009).

(Continued)

*Primary Examiner* — Richard A Huhn
(74) *Attorney, Agent, or Firm* — Leydig, Voit & Mayer, Ltd.

(57) ABSTRACT

Disclosed is a block copolymer including one or more blocks of an acrylate polymer and one or more blocks of a chloroprene polymer, wherein the number average molecular weight of the block copolymer is 110,000 or more, the number average molecular weight of the block of a chloroprene polymer is 80,000 or more in total, and the block copolymer has a functional group with a structure represented by the following chemical formula (1) or (2):

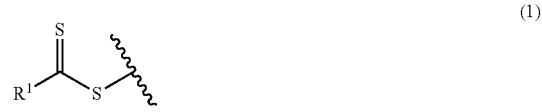

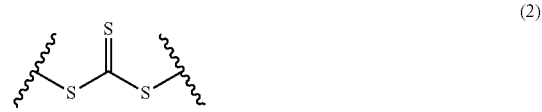

wherein in the chemical formula (1), $R^1$ represents hydrogen, chlorine, a substituted or unsubstituted alkyl group, a substituted or unsubstituted alkenyl group, a substituted or unsubstituted aryl group or a substituted, or unsubstituted heterocyclyl group.

9 Claims, No Drawings

(56) References Cited

FOREIGN PATENT DOCUMENTS

| JP | 2010-001458 A | 1/2010 |
|---|---|---|
| WO | WO 98/01478 A1 | 1/1998 |
| WO | WO 99/031144 A1 | 6/1999 |
| WO | WO 99/035177 A1 | 7/1999 |
| WO | WO 02/090392 A1 | 11/2002 |
| WO | WO 03/055919 A1 | 7/2003 |
| WO | WO 2007/007681 A1 | 1/2007 |

OTHER PUBLICATIONS

Japan Patent Office, International Search Report in International Application No. PCT/JP2018/028692 (dated Oct. 23, 2018).
Japan Patent Office, Written Opinion in International Application No. PCT/JP2018/028692 (dated Oct. 23, 2018).
International Bureau of WIPO, International Preliminary Report on Patentability in International Application No. PCT/JP2018/028692 (dated Feb. 4, 2020).
European Patent Office, Supplementary Partial European Search Report in European Patent Application No. 18842107.7 (dated Nov. 20, 2020).
European Patent Office, Supplementary Partial European Search Report in European Patent Application No. 18842107.7 (dated Aug. 13, 2020).
China National Intellectual Property Administration, Office Action issued in Chinese Application No. 201880049556.6 (dated Feb. 8, 2022).
Herong et al., "Polymer Physics", *East China Institute of Chemical Technology*, pp. 1-3 (1990).
Hongqiang, Li, "Principle, Techniques, and Applications of Glue Adhesion", *Guangzhou: South China University of Technology Press*, pp. 1-4 (2014).
Li et al., "Applied Chemistry in Packaging", *"Twelfth Five-Year Plan" Textbooks for General Higher Education Undergraduates of Packaging Specialty*, pp. 1-5 (2014).
Zhongling, Hong, "Deep Processing of Chemical Organic Feedstocks", *Chemical Industry Press*, pp. 1-4 (1997)

\* cited by examiner

BLOCK COPOLYMER AND PRODUCTION METHOD FOR BLOCK COPOLYMER

CROSS-REFERENCE TO RELATED APPLICATIONS

This patent application is the U.S. national phase of International Application No. PCT/JP2018/028692, filed on Jul. 31, 2018, which claims the benefit of Japanese Patent Application No. 2017-148286, filed Jul. 31, 2017, the disclosures of which are incorporated herein by reference in their entireties for all purposes.

TECHNICAL FIELD

The present technique relates to a block copolymer and a method for producing the block copolymer. More specifically, the technique relates to a block copolymer including one or more blocks of an acrylate polymer and one or more blocks of a chloroprene polymer, and a method for producing the block copolymer.

BACKGROUND ART

Block copolymers including a block of an acrylate polymer and a block of a chloroprene polymer have been studied and developed. For example, Example 4 of Patent Literature 1 discloses a butyl acrylate copolymer-CR di-block form having a number average molecular weight of 83,100. Furthermore, Patent Literature 2 discloses a technique in which chloroprene having dithiocarbamate at both ends is prepared by photopolymerization and then a methyl acrylate/chloroprene polymer is prepared.

CITATION LIST

Patent Literature

Patent Literature 1: WO 2007/007681 A1
Patent Literature 2: JP H2-300217 A

SUMMARY OF INVENTION

Technical Problem

The block copolymer disclosed in Patent Literature 1 has small number average molecular weight, and thus is inadequate to withstand industrial application. It is preferable that the number average molecular weight be 110,000 or more to be able to withstand industrial application. Furthermore, the styrene/chloroprene polymer disclosed in Patent Literature 2 does not have an active functional group and thus has poor physical properties. Moreover, a problem is that benzene needs to be used as an organic solvent in both of Patent Literatures 1 and 2.

Meanwhile, it has been known that chloroprene-based polymers can be used for a rubber composition or a vulcanized product thereof. For example, rubber compositions and vulcanized products thereof, such as rubber rolls, base isolation or vibration isolation parts, wiper blades and automobile parts, are required to achieve both flexibility and mechanical strength. However, since the methyl acrylate/chloroprene polymer disclosed in Patent Literature 2 does not have an active functional group, it is difficult to obtain a rubber composition or a vulcanized product thereof achieving both flexibility and mechanical strength, and the polymer is not suitable as a raw material for those compositions.

Thus, a main object of the present invention is to provide a block copolymer of an acrylate polymer and a chloroprene polymer, having a number average molecular weight of 110,000 or more, and suitable for industrial production and suitable for a rubber composition or a vulcanized product thereof.

Solution to Problem

Accordingly, the present invention provides:
a block copolymer including one or more blocks of an acrylate polymer and one or more blocks of a chloroprene polymer, wherein the number average molecular weight of the block copolymer is 110,000 or more, the number average molecular weight of the block of a chloroprene polymer is 80,000 or more in total, and the block copolymer has a functional group with a structure represented by the following chemical formula (1) or (2):

[Chem. 1]

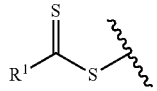

(1)

[Chem. 2]

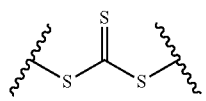

(2)

wherein in the chemical formula (1), $R^1$ represents hydrogen, chlorine, a substituted or unsubstituted alkyl group, a substituted or unsubstituted alkenyl group, a substituted or unsubstituted aryl group or a substituted, or unsubstituted heterocyclyl group.

The above block copolymer may be a block copolymer having a functional group with a structure represented by the following chemical formula (1) at an end:

[Chem. 3]

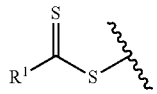

(1)

wherein in the chemical formula (1), $R^1$ represents hydrogen, chlorine, a substituted or unsubstituted alkyl group, a substituted or unsubstituted alkenyl group, a substituted or unsubstituted aryl group or a substituted, or unsubstituted heterocyclyl group.

In the above block copolymer, the acrylate may be at least one selected from the group consisting of methyl acrylate, ethyl acrylate, n-propyl acrylate, n-butyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate, n-octadecyl acrylate, 2-methoxyethyl acrylate, 2-ethoxyethyl acrylate, 2-(n-propoxy)ethyl acrylate, 2-(n-butoxy)ethyl acrylate, 3-methoxypropyl acrylate, 3-ethoxypropyl acrylate, 2-(n-propoxy)propyl acrylate and 2-(n-butoxy)propyl acrylate.

In the above block copolymer, the acrylate may be alkyl acrylate having an alkyl group having 5 or more carbon atoms.

The present invention provides:

a method for producing a block copolymer, the method including performing radical emulsion polymerization of an acrylate alone, or an acrylate and another monomer in the presence of a RAFT agent to synthesize a block of an acrylate polymer, and then performing radical emulsion polymerization of chloroprene alone, or chloroprene and another monomer in a mixture to synthesize a block of a chloroprene polymer, wherein the number average molecular weight of the block copolymer is 110,000 or more and the number average molecular weight of the block of a chloroprene polymer is 80,000 or more in total.

The present invention provides:

a method for producing a block copolymer, the method including performing radical emulsion polymerization in the presence of a RAFT agent while adding chloroprene alone, or chloroprene and another monomer stepwise to synthesize a block of a chloroprene polymer, and then performing radical emulsion polymerization of an acrylate alone, or an acrylate and another monomer in a mixture to synthesize a block of an acrylate polymer, wherein the number average molecular weight of the block copolymer is 110,000 or more and the number average molecular weight of the block of a chloroprene polymer is 80,000 or more in total.

The RAFT agent may be a RAFT agent represented by the following chemical formula (3) or (4):

[Chem. 4]

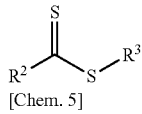

(3)

[Chem. 5]

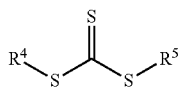

(4)

wherein in the chemical formula (3), $R^2$ represents hydrogen, chlorine, a substituted or unsubstituted alkyl group, a substituted or unsubstituted alkenyl group, a substituted or unsubstituted aryl group or a substituted, or unsubstituted heterocyclyl group; and in the chemical formulas (3) and (4), $R^3$ to $R^5$ each independently represent a substituted or unsubstituted alkyl group, a substituted or unsubstituted, saturated or unsaturated, or aromatic carbocycle, a substituted or unsubstituted, saturated or unsaturated, or aromatic heterocycle, an organic metal species, or a polymer chain.

The present invention provides a composition including the block copolymer.

The composition may be a rubber composition.

The present invention provides a vulcanized product prepared by using the rubber composition.

The present invention provides a vulcanized molded article prepared by using the rubber composition.

The present invention provides a rubber roll, a base isolation or vibration isolation part, a wiper blade or an automobile part, prepared by using the vulcanized molded article.

Advantageous Effects of Invention

According to the present invention, a block copolymer of an acrylate polymer and a chloroprene polymer suitable for industrial production and suitable for a rubber composition, whose number average molecular weight is 110,000 or more and in which the number average molecular weight of the block of a chloroprene polymer is 80,000 or more in total, can be provided. In particular, according to the present invention, a rubber composition or a vulcanized product thereof having excellent flexibility and mechanical strength can be provided.

DESCRIPTION OF EMBODIMENTS

Hereinafter, embodiments of the present invention will be described.

<Block Copolymer>

The block copolymer of the present embodiment is a block copolymer including one or more blocks of an acrylate polymer and one or more blocks of a chloroprene polymer, and the number average molecular weight of the block copolymer is 110,000 or more, the number average molecular weight of the block of a chloroprene polymer is 80,000 or more in total, and the block copolymer has a functional group with a structure represented by the following chemical formula (1) or (2).

[Chem. 6]

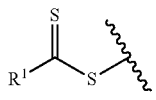

(1)

[Chem. 7]

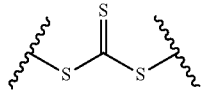

(2)

In the chemical formula (1), $R^1$ represents hydrogen, chlorine, a substituted or unsubstituted alkyl group, a substituted or unsubstituted alkenyl group, a substituted or unsubstituted aryl group or a substituted, or unsubstituted heterocyclyl group. Preferred examples of $R^1$ include a pyrrole group, a pyrazole group, a pyridyl group, a p-methoxyphenyl group and p-N,N-dimethylaminophenyl group.

The functional group with a structure represented by the chemical formula (1) or (2) is introduced into a polymer by performing radical polymerization in the presence of a RAFT agent represented by the chemical formula (3) or (4). This phenomenon has been clarified in a literature on a typical RAFT polymerization (Aust. J. Chem. 2009, 62, 1402-1472). The presence of the functional group in a polymer can be observed by any method, and usually 13C-NMR is used (J. Polym. Sci., Part A: Polym. Chem., 2009, 47, 3118-3130). Functional groups can be observed and their presence can be confirmed by 13C-NMR with an adequate cumulative number. Those skilled in the art can observe the presence of the functional group represented by the above formula by a similar measurement of a polymer prepared by living radical emulsion polymerization reaction using a $^{13}C$-enriched compound represented by the chemical formula (3) or (4).

The above functional group, which is an active functional group, serves as a cross-linking point when the block copolymers of the present embodiment are cross-linked, and causes changes in physical properties of a composition prepared by mixing the block copolymer. Thus, the block copolymer is considered to have the effect of improving mechanical strength of a vulcanized (cross-linked) rubber composition.

The acrylate polymer in the block of an acrylate polymer may be a homopolymer of one acrylate, a copolymer of 2 or more acrylates, or a copolymer of an acrylate and another monomer. It is preferable that the acrylate be at least one selected from the group consisting of methyl acrylate, ethyl acrylate, n-propyl acrylate, n-butyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate, n-octadecyl acrylate, 2-methoxyethyl acrylate, 2-ethoxyethyl acrylate, 2-(n-propoxy)ethyl acrylate, 2-(n-butoxy)ethyl acrylate, 3-methoxypropyl acrylate, 3-ethoxypropyl acrylate, 2-(n-propoxy)propyl acrylate and 2-(n-butoxy)propyl acrylate.

In the present embodiment, alkyl acrylate is more preferred among acrylates, and alkyl acrylate having an alkyl group having 5 or more carbon atoms is further preferred in order for the cross-linked rubber prepared from the present block copolymer to have high flexibility. Examples of alkyl acrylates having an alkyl group having 5 or more carbon atoms include 2-ethylhexyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate and n-octadecyl acrylate. In particular, 2-ethylhexyl acrylate is more preferred from among these.

Examples of another monomer forming a copolymer with an acrylate include conjugated dienes such as butadiene and isoprene, aromatic vinyl compounds such as styrene, methacrylic acid and esters thereof, acrylonitrile and methacrylonitrile.

The block of a chloroprene polymer may be a homopolymer of chloroprene (2-chloro-1,3-butadiene) or a copolymer of chloroprene and another monomer capable of forming a copolymer with chloroprene. Examples of another monomer forming a copolymer with chloroprene include 2,3-dichloro-1,3-butadiene, 1-chloro-1,3-butadiene, acrylonitrile, methacrylonitrile, butadiene, isoprene, styrene and methacrylic acid and esters thereof. The chloroprene polymer is preferably a homopolymer of chloroprene (polychloroprene).

The number average molecular weight (Mn) of the block copolymer is 110,000 or more, preferably 120,000 or more, and preferably 300,000 or less to fully withstand industrial application. A number average molecular weight of 300,000 or less provides a block copolymer which can be easily processed into a composition. Furthermore, the molecular weight distribution (Mw/Mn), which represents the ratio of weight average molecular weight (Mw) to number average molecular weight (Mn), of the block copolymer of the present embodiment is preferably 1.3 or more, and more preferably 1.6 or more. The molecular weight distribution is usually 6.0 or less, and preferably 3.0 or less. When the molecular weight distribution of the block copolymer is in this range, physical properties of a rubber composition containing the block copolymer or a vulcanized product thereof are improved.

The number average molecular weight of the block of a chloroprene polymer included in the block copolymer is 80,000 or more, and preferably 100,000 or more in total. When there are a plurality of blocks of a chloroprene polymer in a molecule of the block copolymer, the number average molecular weight of the blocks of a chloroprene polymer described here means the sum of the number average molecular weight of the respective chloroprene blocks. With a number average molecular weight of 80,000 or more, more preferable physical properties of a breaking strength of 15 MPa or more and breaking elongation of 300% or more can be obtained when a cross-linked rubber is prepared. A rubber composition containing a block copolymer in which the number average molecular weight of the block of a chloroprene polymer is less than 80,000 in total, or a vulcanized product thereof, may have poor mechanical strength.

In the present specification, the number average molecular weight and the weight average molecular weight refer to values measured by gel permeation chromatography (GPC).

The block copolymer of the present invention including one or more blocks of an acrylate polymer and one or more blocks of a chloroprene polymer and having a functional group with a structure represented by the chemical formula (1) or (2) includes di-block copolymers having a structure represented by the following structural formula (a), (b), (e) or (f). The above block copolymer also includes tri-block copolymers having a structure represented by the following structural formula (c) or (d).

| | |
|---|---|
| A-B-X | (a) |
| B-A-X | (b) |
| A-B-A-X | (c) |
| B-A-B-X | (d) |
| A-B-X-B-A | (e) |
| B-A-X-A-B | (f) |

In the above structural formulas (a) to (f), A represents a block of an acrylate polymer, B represents a block of a chloroprene polymer, and X represents a functional group represented by the above chemical formula (1) or (2).

The block copolymer of the present embodiment is preferably a block copolymer having a functional group with a structure represented by the chemical formula (1) at an end. The copolymer has, for example, a structure represented by the above structural formulas (a), (b), (c) and (d). The present block copolymer can be synthesized by using a RAFT agent of chemical formula (3). The presence of a functional group at an end can improve vulcanizing (cross-linking) properties of a composition containing the present block copolymer.

In the present specification, the number average molecular weight of only the second block of the di-block copolymer is calculated by the following expression.

(Number average molecular weight of second block)=(Number average molecular weight of first block+second block)−(Number average molecular weight of first block)

Likewise, the number average molecular weight of only the third block of the tri-block copolymer is calculated by the following expression.

(Number average molecular weight of third block)= (Number average molecular weight of first block+second block+third block)−(Number average molecular weight of first block+second block)

Here, the number average molecular weight of the first block, the number average molecular weight of the first block+the second block, and the number average molecular weight of the first block+the second block+the third block can be determined by a GPC analysis of a polymer sampled in a small amount when the polymerization of each of the first block, the second block and the third block was completed.

<2. Method for Producing Block Copolymer>

Next, the method for producing a block copolymer according to an embodiment of the present invention will be described. The block copolymer described above can be produced by this method.

More specifically, the above block copolymer is obtained by performing radical polymerization in the presence of a RAFT agent.

A known RAFT agent may be used as the RAFT agent. The RAFT agents described in JP 2000-515181 A and JP 2002-508409 A may be used as the RAFT agent. In the method for producing a block copolymer of the present embodiment, the above RAFT agent is preferably a RAFT agent represented by the following chemical formula (3) or (4).

[Chem. 8]

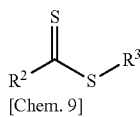

(3)

[Chem. 9]

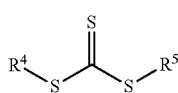

(4)

In the chemical formula (3), $R^2$ represents hydrogen, chlorine, a substituted or unsubstituted alkyl group, a substituted or unsubstituted alkenyl group, a substituted or unsubstituted aryl group or a substituted or unsubstituted heterocyclyl group. Preferred examples of $R^2$ include a pyrrole group, a pyrazole group, a pyridyl group, a p-methoxyphenyl group and p-N,N-dimethylaminophenyl group. In the chemical formulas (3) and (4), $R^3$ to $R^5$ each independently represent a substituted or unsubstituted alkyl group, a substituted or unsubstituted, saturated or unsaturated, or aromatic carbocycle, a substituted or unsubstituted, saturated or unsaturated, or aromatic heterocycle, an organic metal species, or a polymer chain. In the chemical formulas (3) and (4), $R^3$ to $R^5$ is preferably each independently a benzyl group, a butyl group, a dodecyl group, a 2-cyano-2-propyl group or a cyanomethyl group.

The compound represented by the above chemical formula (3) is not particularly limited, and a usual compound may be used. Examples thereof include dithiocarbamates and dithioesters. Specific examples thereof include benzyl 1-pyrrolecarbodithioate (also known as benzyl 1-pyrrole dithiocarbamate), benzyl phenylcarbodithioate, 1-benzyl-N,N dimethyl-4-aminodithiobenzoate, 1-benzyl-4-methoxydithiobenzoate, 1-phenylethyl imidazolecarbodithioate (also known as 1-phenylethyl imidazoledithiocarbamate), benzyl-1-(2-pyrrolidinone)carbodithioate)(also known as benzyl-1-(2-pyrrolidinone)dithiocarbamate), benzylphthalimidylcarbodithioate, (also known as benzylphthalimidyldithiocarbamate), 2-cyanoprop-2-yl-1-pyrrolecarbodithioate, (also known as 2-cyanoprop-2-yl-1-pyrroledithiocarbamate), 2-cyanobut-2-yl-1-pyrrolecarbodithioate, (also known as 2-cyanobut-2-yl-1-pyrroledithiocarbamate), benzyl-1-imidazolecarbodithioate, (also known as benzyl-1-imidazoledithiocarbamate), 2-cyanoprop-2-yl-N,N-dimethyldithiocarbamate, benzyl-N,N-diethyldithiocarbamate, cyanomethyl-1-(2-pyrrolidone)dithiocarbamate, 2-(ethoxycarbonylbenzyl)prop-2-yl-N,N-diethyldithiocarbamate, 1-phenylethyldithiobenzoate, 2-phenylprop-2-yldithiobenzoate, 1-acetic acid-1-yl-ethyl-dithiobenzoate, 1-(4-methoxyphenyl)ethyldithiobenzoate, benzyl dithioacetate, ethoxycarbonylmethyl dithioacetate, 2-(ethoxycarbonyl)prop-2-yl dithiobenzoate, 2-cyanoprop-2-yl dithiobenzoate, tert-butyl dithiobenzoate, 2,4,4-trimethylpent-2-yl dithiobenzoate, 2-(4-chlorophenyl)-prop-2-yl dithiobenzoate, 3-vinylbenzyl dithiobenzoate, 4-vinylbenzyl dithiobenzoate, benzyl diethoxyphosphinyl dithioformate, tert-butyl trithioperbenzoate, 2-phenylprop-2-yl-4-chlorodithiobenzoate, naphthalene-1-carboxylic acid-1-methyl-1-phenyl-ethyl ester, 4-cyano-4-methyl-4-thiobenzyl sulfanylbutyric acid, dibenzyl tetrathioterephthalate, carboxymethyl dithiobenzoate, poly(ethylene oxide) having a dithiobenzoate end group, poly(ethylene oxide) having a 4-cyano-4-methyl-4-thiobenzylsulfanylbutyric acid end group, 2-[(2-phenylethanethioyl)sulfanyl]propanoic acid, 2-[(2-phenylethanethioyl)sulfanyl]succinic acid, potassium 3,5-dimethyl-1H-pyrazole-1-carbodithioate, cyanomethyl-3,5-dimethyl-1H-pyrazole-1-carbodithioate, cyanomethylmethyl-(phenyl)dithiocarbamate, benzyl-4-chlorodithiobenzoate, phenylmethyl-4-chlorodithiobenzoate, 4-nitrobenzyl-4-chlorodithiobenzoate, phenylprop-2-yl-4-chlorodithiobenzoate, 1-cyano-1-methylethyl-4-chlorodithiobenzoate, 3-chloro-2-butenyl-4-chlorodithiobenzoate, 2-chloro-2-butenyl dithiobenzoate, benzyl dithioacetate, 3-chloro-2-butenyl-1H-pyrrole-1-dithiocarboxylic acid, 2-cyanobutan-2-yl 4-chloro-3,5-dimethyl-1H-pyrazole-1-carbodithioate and cyanomethylmethyl (phenyl)carbamodithioate.

Benzyl 1-pyrrole dithiocarbamate, 1-benzyl-N,N dimethyl-4-aminodithiobenzoate and 1-benzyl-4-methoxydithiobenzoate are more preferred from among these compounds because of their excellent controllability of polymerization of chloroprene in emulsion polymerization.

The compound represented by the above formula (4) is not particularly limited, and a usual compound may be used. Examples thereof include trithiocarbonates such as 2-cyano-2-propyldodecyl trithiocarbonate, dibenzyl trithiocarbonate, butylbenzyl trithiocarbonate, 2-[[(butylthio)thioxomethyl]thio]propionic acid, 2-[[(dodecylthio)thioxomethyl]thio] propionic acid, 2-[[(butylthio)thioxomethyl]thio]succinic acid, 2-[[(dodecylthio)thioxomethyl]thio]succinic acid, 2-[[(dodecylthio)thioxomethyl]thio]-2-methylpropionic acid, 2,2'-[carbonothioylbis(thio)]bis[2-methylpropionic acid], 2-amino-1-methyl-2-oxoethylbutyl trithiocarbonate, benzyl2-[(2-hydroxyethyl)amino]-1-methyl-2-oxoethyl trithiocarbonate, 3-[[[(tert-butyl)thio]thioxomethyl]thio]propionic acid, cyanomethyldodecyl trithiocarbonate, diethylaminobenzyl trithiocarbonate and dibutylaminobenzyl trithiocarbonate. Butylbenzyl trithiocarbonate and dibenzyl trithiocarbonate are preferred, and dibenzyl trithiocarbonate is more preferred from among these compounds because of their excellent controllability of polymerization.

The production method of the present embodiment is roughly classified into a method in which a block of an acrylate polymer is first synthesized and then a block of a chloroprene polymer is synthesized (Method I) and a method in which a block of a chloroprene polymer is first synthesized and then a block of an acrylate polymer is synthesized (Method II). In the following the respective methods will be described in detail.

<2-1. Method I>

In Method I, radical emulsion polymerization of an acrylate alone or an acrylate and another monomer is performed in the presence of the above RAFT agent to synthesize a block of an acrylate polymer (polymerization of the first block), and then radical emulsion polymerization of chloroprene alone or chloroprene and another monomer in a mixture is performed to synthesize a block of a chloroprene polymer (polymerization of the second block).

The compound represented by the above formula (3) or (4) functions as a chain transfer agent in a living radical emulsion polymerization. The residue of the compound remains as a functional group in the block copolymer produced. For this reason, the block copolymer produced by the present method has a functional group with a structure represented by the above formula (1) or (2).

It is preferable that the amount of the compound represented by the above formula (3) or (4) be 2 moles or less per 100 moles of all monomers consumed in polymerization in order to obtain a block copolymer intended in the present embodiment.

In the above method, the above acrylate is used for synthesizing the block of an acrylate polymer.

It is preferable that in this method, after an acrylate, another necessary monomer and a compound represented by the above formula (3) or (4) be emulsified in water by using an emulsifier/dispersant, a radical polymerization initiator is added thereto to allow a polymerization reaction to proceed in micelles of the emulsifier/dispersant. The acrylate and another necessary monomer may be fed batchwise at the initial stage, or some may be fed at the initial stage and the remainder may be added stepwise.

The polymerization ratio of an acrylate and another necessary monomer is not particularly limited, and is preferably 80% or more, and particularly preferably 90% or more because efficiency of removing residual monomers by vacuum distillation is increased.

Examples of radical polymerization initiators include organic peroxides such as benzoyl peroxide and isobutyryl peroxide, and azo compounds such as azobisisobutyronitrile and 4-methoxy-azobisvaleronitrile. These may be used singly or in combinations of two or more. The amount of the radical polymerization initiator may be, for example, 0.001 to 5 parts by mass per 100 parts by mass of the acrylate monomer.

The emulsifier/dispersant used in emulsion polymerization is not particularly limited, and an anionic or nonionic emulsifier/dispersant is preferred from the viewpoint of emulsion stability. It is preferable to use alkali metal salt of rosin acid, particularly because moderate strength can be given to the above block copolymer in the form of film when frozen, coagulated and dried after completion of polymerization to prevent excessive shrinkage and break. Rosin acid is a mixture of resin acid, fatty acid and the like. Examples of resin acids include abietic acid, neoabietic acid, palustric acid, pimaric acid, isopimaric acid, dehydroabietic acid, dihydropimaric acid, dehydro isopimaric acid, secodehydroabietic acid and dihydroabietic acid. Examples of fatty acids include oleic acid and linoleic acid. The composition of these components varies depending on the difference in the method of collecting rosins, which are classified into gum rosin, wood rosin and tall rosin, the origin and the type of pine, distillation purification and disproportionation reaction, and is not limited in the present invention. Use of sodium salt or potassium salt is preferred in consideration of emulsion stability and easy handling. The concentration of the emulsifier/dispersant is preferably 0.1 to 10% by mass, and more preferably 1 to 5% by mass. When the concentration is 0.1% by mass or more, monomers can be thoroughly emulsified. When the concentration is 10% by mass or less, the above block copolymer is easily precipitated when formed into solid.

The polymerization temperature when synthesizing the block of an acrylate polymer may be determined based on the type of monomers and the like, and is preferably 10 to 100° C., and more preferably 70 to 100° C.

After synthesizing the block of an acrylate polymer, radical emulsion polymerization of chloroprene alone, or chloroprene and another monomer in a mixture is performed to synthesize a block of a chloroprene polymer (polymerization of the second block). The another monomer may be one copolymerizable with chloroprene, and examples thereof include 2,3-dichloro-1,3-butadiene, 1-chloro-1,3-butadiene, acrylonitrile, methacrylonitrile, butadiene, isoprene, styrene and methacrylic acid and esters thereof. It is preferable that of them, chloroprene alone be used.

For the synthesis of the block of a chloroprene polymer, seed polymerization may be continuously performed with the latex containing the block of an acrylate polymer, without removing the block of an acrylate polymer, but this is not limited. The block of an acrylate polymer may be once removed from the polymerization system, and then the block of an acrylate polymer and monomers such as chloroprene may be dissolved in a solvent to synthesize a block of a chloroprene polymer.

Although chloroprene and another necessary monomer may be added batchwise or stepwise, it is preferable to add them to the polymerization system batchwise. When they are added stepwise, the amount of the chloroprene monomer is relatively small based on the amount of active ends of the block of an acrylate polymer in micelles, and thus a side reaction may occur. By contrast, in the case of batchwise addition, the amount of the chloroprene monomer is relatively increased, and thus controllability of polymerization is improved.

The polymerization temperature when synthesizing the block of a chloroprene polymer is preferably 10 to 50° C. in order to ensure the stability of the block of a chloroprene polymer. When the polymerization temperature is 10° C. or more, viscosity of emulsion and efficiency of initiators can be improved. Furthermore, since the boiling point of chloroprene is about 59° C., when the polymerization temperature is 50° C. or less, bumping of reaction solution, which occurs when heat could not be thoroughly removed, can be avoided, even when heat generation occurs due to abnormal polymerization and the like.

Furthermore, the polymerization ratio of the block of a chloroprene polymer is preferably 95% or less, and particularly preferably 85% or less in order to prevent the block copolymer from being gelled. The polymerization ratio is preferably 40% or more, and particularly preferably 50% or more from the viewpoint of productivity in batchwise polymerization. The polymerization ratio may be adjusted by stopping polymerization reaction by adding a polymerization inhibitor. Examples of polymerization inhibitors include, but are not particularly limited to, oil-soluble polymerization inhibitors such as thiodiphenylamine, 4-tert-butylcatechol and 2,2-methylenebis-4-methyl-6-tert-butylphenol, and water-soluble polymerization inhibitors such as diethylhydroxylamine.

Unreacted monomers may be removed by a known method such as heating under reduced pressure. Then, the pH is adjusted, and a solid block copolymer may be collected through the steps of freezing and coagulation, washing with water, hot air drying and the like.

The number average molecular weight of the resulting block copolymer is 110,000 or more, and the number average molecular weight of the block of a chloroprene polymer is 80,000 or more in total. The number average molecular weight may be adjusted by optionally setting the ratio of feeding of monomers and radical polymerization initiators and the polymerization ratio.

The resulting block copolymer has a structure represented by the formula (a) "A-B-X" or the formula (e) "A-B-X-B-A" of the structures represented by the above formulas (a) to (f).

After synthesizing a block of an acrylate polymer and removing unreacted monomers according to the present method, a block of an acrylate polymer may be further synthesized by radical emulsion polymerization of chloroprene alone, or chloroprene and another monomer in a mixture (polymerization of the third block). This can produce a block copolymer having a structure represented by the above formula (c) "A-B-A-X."

<2-2. Method II>

In Method II, radical emulsion polymerization is performed in the presence of a RAFT agent represented by the above formula (3) or (4) while adding chloroprene alone, or chloroprene and another monomer stepwise to synthesize a block of a chloroprene polymer (polymerization of the first block), and then radical emulsion polymerization of an acrylate alone or an acrylate and another monomer in a mixture is performed to synthesize a block of an acrylate polymer (polymerization of the second block).

In the explanation of Method II, differences between the above Method I will be described while omitting explanation for the same points.

In the present method, a mixture prepared by mixing a chain transfer agent to part of chloroprene, or chloroprene and another monomer is fed at the initial stage of synthesizing a block of a chloroprene polymer, and the remaining chloroprene, or chloroprene and another monomer are added stepwise. When polymerization is performed while adding chloroprene monomer and a chain transfer agent batchwise, controllability of polymerization may be reduced.

It is preferable that in the present method, preferably 1 to 50% by mass, more preferably 5 to 50% by mass, and most preferably 20 to 40% by mass of chloroprene and another necessary monomer be first emulsified in water together with a compound represented by the above formula (3) or (4) using a emulsifier/dispersant. Then, a block of a chloroprene polymer is synthesized by radical emulsion polymerization of chloroprene and another necessary monomer while adding them stepwise.

It is preferable that after synthesizing the block of a chloroprene polymer, unreacted monomers be removed. Then, a block of an acrylate polymer is synthesized by radical emulsion polymerization of an acrylate alone or an acrylate and another monomer in a mixture. Acrylate and monomers copolymerizable with an acrylate may be added batchwise.

The resulting block copolymer has a structure represented by the formula (b) "B-A-X" or the formula (f) "B-A-X-A-B" of the structures represented by the above formulas (a) to (f).

After synthesizing a block of an acrylate polymer and removing unreacted monomers according to the present method, a block of a chloroprene polymer may be further synthesized by radical emulsion polymerization of chloroprene alone, or chloroprene and another monomer in a mixture (polymerization of the third block). This can produce a block copolymer having a structure represented by the above formula (d) "B-A-B-X."

It is preferable that when the block of a chloroprene polymer is further synthesized, chloroprene and another necessary monomer be added batchwise. By doing so, polymerization reaction can be performed in conditions in which a sufficient amount of chloroprene monomers exist relative to the block of an acrylate polymer, and synthesis of the block of a chloroprene polymer proceeds smoothly.

As described above, in the method of the present embodiment, a block copolymer including a block of an acrylate polymer and a block of a chloroprene polymer is produced by radical emulsion polymerization. Although technique of preparing a styrene/chloroprene polymer by photopolymerization has been conventionally known (the above Patent Literature 2), this photopolymerization requires an organic solvent to perform the reaction, and thus is not suitable for industrial production. The method of the present embodiment, however, can produce a block copolymer without using photopolymerization, and thus is suitable for industrial production.

<3. Composition>

The composition according to an embodiment of the present invention contains the above block copolymer, and is preferably a rubber composition. A rubber composition containing the above block copolymer can achieve both flexibility and mechanical strength.

In the composition of the present embodiment, raw materials other than the block copolymer are not particularly limited, and may be suitably selected depending on the intended purpose and application. Examples of raw materials to be contained in the rubber composition include a vulcanizing agent, a vulcanization accelerator, a filler or a reinforcing agent, a plasticizer, a processing aid, a lubricant, an antidegradant and a silane coupling agent.

Examples of vulcanizing agents which can be added include organic vulcanizing agents usually used for vulcanization of chloroprene rubber, such as a sulfur, a thiourea-based, a guanidine-based, a thiuram-based or a thiazole-based organic vulcanizing agent, and thiourea-based vulcanizing agents are preferred. Examples of thiourea-based vulcanizing agents include ethylene thiourea, diethyl thiourea, trimethyl thiourea, triethyl thiourea and N,N'-diphenyl thiourea, and trimethyl thiourea and ethylene thiourea are particularly preferred. Furthermore, a vulcanizing agent such as a mixture of 3-methyl thiazolidinethione-2-thiazole and phenylene dimaleimide, dimethylammonium hydrogen isophthalate or a 1,2-dimercapto-1,3,4-thiadiazole derivative, or N-cyclohexylthio phthalimide may be used. These vulcanizing agents listed above may be used in combinations of two or more. Alternatively, a single metal such as beryllium, magnesium, zinc, calcium, barium, germanium, titanium, tin, zirconium, antimony, vanadium, bismuth, molybdenum, tungsten, tellurium, selenium, iron, nickel, cobalt and osmium, and an oxide or hydroxide of these metals may be used as a vulcanizing agent. Of these vulcanizing agents to be added, calcium oxide, zinc oxide, antimony dioxide, antimony trioxide and magnesium oxide are particularly preferred because they are highly effective for vulcanization. These vulcanizing agents may be used in combinations of two or more. It is preferable that the vulcanizing agent be added in the range of 0.1 parts by mass or more and 10 parts by mass or less in total per 100 parts by mass of the rubber component.

The filler or reinforcing agent is added to adjust the hardness of rubber and to improve its mechanical strength, and is not particularly limited. Examples thereof include carbon black, silica, clay, talc and calcium carbonate. Other inorganic fillers are not particularly limited, and alumina ($Al_2O_3$) such as γ-alumina and α-alumina, alumina monohydrate ($Al_2O_3.H_2O$) such as boehmite and diaspore, aluminum hydroxide [$Al(OH)_3$] such as gibbsite and bayerite, aluminum carbonate [$Al_2(CO_3)_2$], magnesium hydroxide [$Mg(OH)_2$], magnesium carbonate ($MgCO_3$), talc ($3MgO.4SiO_2.H_2O$), attapulgite ($5MgO.8SiO_2.9H_2O$), titanium white ($TiO_2$), titanium black ($TiO_{2n-1}$), calcium oxide (CaO), calcium hydroxide [$Ca(OH)_2$], aluminum magnesium oxide ($MgO.Al_2O_3$), clay ($Al_2O_3.2SiO_2$), kaolin ($Al_2O_3.2SiO_2.2H_2O$), pyrophyllite ($Al_2O_3.4SiO_2H_2O$), bentonite ($Al_2O_3.4SiO_2.2H_2O$), aluminum silicate (e.g., $Al_2SiO_5$, $Al_4.3SiO_4.5H_2O$), magnesium silicate (e.g., $Mg_2SiO_4$, $MgSiO_3$), calcium silicate (e.g., $Ca_2SiO_4$), aluminum calcium silicate (e.g., $Al_2O_3.CaO.2SiO_2$), magnesium calcium silicate ($CaMgSiO_4$), calcium carbonate ($CaCO_3$), zirconium oxide ($ZrO_2$), zirconium hydroxide [$ZrO(OH)_2.nH_2O$], zirconium carbonate [$Zr(CO3)_2$], and crystalline aluminosilicate containing charge-correcting hydrogen and alkali metal or alkaline earth metal, such as various zeolites, may be used. Fillers and reinforcing agents may be used singly or in combinations of two or more. The amounts of these fillers and reinforcing agents to be blended may be adjusted based on the properties required for the rubber composition and a vulcanized molded article thereof of the present embodiment, and is not particularly limited. The filler and the reinforcing agent may be added in the range of usually 15 parts by mass or more and 200 parts by mass or less in total per 100 parts by mass of the rubber component in the rubber composition of the present embodiment.

Plasticizers are not particularly limited as long as they are compatible with rubber. Examples thereof include vegetable oils such as rapeseed oil, linseed oil, castor oil and coconut oil, phthalate plasticizers, DUP (diundecyl phthalate), DOS (dioctyl sebacate), DOA (dioctyl adipate), TOP (trioctyl phosphate), ester plasticizers, ether ester plasticizers, thioether plasticizers, and petroleum-based plasticizers such as aromatic oil, naphthene oil, lubricanting oil, process oil, paraffin, liquid paraffin, vaseline and petroleum asphalt. One or a plurality of them may be used depending on the properties required for the rubber composition and a vulcanized product of the composition of the present embodiment. The amount of the plasticizer to be blended is not particularly limited, and the plasticizer may be blended in the range of usually 5 parts by mass or more and 50 parts by mass or less in total per 100 parts by mass of the rubber component in the rubber composition of the present embodiment.

Examples of processing aids and lubricants, which are added to improve processing properties and surface lubricity to facilitate separation from a roll, a molding mold, or a screw of an extruder when a rubber composition is kneaded, vulcanized and molded, include fatty acids such as stearic acid, paraffin processing aids such as polyethylene, and fatty acid amide. Processing aids and lubricants may be used singly or in combinations of two or more. The amount to be added is not particularly limited, and is usually 0.5 parts by mass or more and 5 parts by mass or less in total per 100 parts by mass of the rubber component in the rubber composition of the present embodiment.

A primary antidegradant usually used for rubber, which prevents autoxidation by scavenging radicals, and a secondary antidegradant which detoxifies hydroperoxide, may be added as an antidegradant for improving heat resistance. These antidegradants may be added in a proportion of 0.1 parts by mass or more and 10 parts by mass or less, preferably 2 parts by mass or more and 5 parts by mass or less, respectively, per 100 parts by mass of the rubber component in the rubber composition. These antidegradants may not only be used singly but also in combinations of two or more. Examples of primary antidegradants include phenol-based antidegradants, amine-based antidegradants, acrylate-based antidegradants, imidazole-based antidegradants, metal carbamates and waxes. Examples of secondary antidegradants include phosphorus-based antidegradants, sulfur-based antidegradants and imidazole-based antidegradants. Examples of antidegradants include, but are not limited to, N-phenyl-1-naphthylamine, alkylated diphenylamine, octylated diphenylamine, 4,4'-bis(α,α-dimethylbenzyl)diphenylamine, p-(p-toluene sulfonylamide)diphenylamine, N,N'-di-2-naphthyl-p-phenylenediamine, N,N'-diphenyl-p-phenylenediamine, N-phenyl-N'-isopropyl-p-phenylenediamine, N-phenyl-N'-(1,3-dimethylbutyl)-p-phenylenediamine, N-phenyl-N-(3-methacryloyloxy-2-hydroxypropyl)-p-phenylenediamine, 1,1,3-tris-(2-methyl-4-hydroxy-5-tert-butylphenyl)butane, 4,4'-butylidene bis-(3-methyl-6-tert-butylphenol), 2,2-thiobis(4-methyl-6-tert-butylphenol), 7-octadecyl-3-(4'-hydroxy-3',5'-di-tert-butylphenyl)propionate, tetrakis-[methylene-3-(3',5'-di-tert-butyl-4'-hydroxyphenyl)propionate]methane, pentaerythritol-tetrakis[3-(3,5-di-tert-butyl-4-hydroxyphenyl)propionate], triethylene glycol-bis[3-(3-tert-butyl-5-methyl-4-hydroxyphenyl)propionate], 1,6-hexanediol-bis [3-(3,5-di-tert-butyl-4-hydroxyphenyl)propionate], 2,4-bis (n-octylthio)-6-(4-hydroxy-3,5-di-tert-butylanilino)-1,3,5-triazine, tris-(3,5-di-tert-butyl-4-hydroxybenzyl)-isocyanurate, 2,2-thio-diethylenebis[3-(3,5-di-tert-butyl-4-hydroxyphenyl)propionate], N,N'-hexamethylene bis(3,5-di-tert-butyl-4-hydroxy)-hydrocinnamide, 2,4-bis [(octylthio)methyl]-o-cresol, 3,5-di-tert-butyl-4-hydroxybenzyl-phosphonate-diethyl ester, tetrakis [methylene(3,5-di-tert-butyl-4-hydroxyhydrocinnamate)] methane, octadecyl-3-(3,5-di-tert-butyl-4-hydroxyphenyl) propionic acid ester, 3,9-bis[2-{3-(3-tert-butyl-4-hydroxy-5-methylphenyl)propionyloxy}-1,1-dimethylethyl]-2,4,8,10-tetraoxaspiro[5.5]undecane, tris(nonyl phenyl)phosphite, tris(mixed mono- and di-nonylphenyl)phosphite, diphenyl mono(2-ethylhexyl)phosphite, diphenyl monotridecyl phosphite, diphenyl isodecyl phosphite, diphenyl isooctyl phosphite, diphenyl nonylphenyl phosphite, triphenylphosphite, tris(tridecyl)phosphite, triisodecylphosphite, tris(2-ethylhexyl)phosphite, tris(2,4-di-tert-butylphenyl)phosphite, tetraphenyldipropylene glycol diphosphite, tetraphenyltetra (tridecyl)pentaerythritol tetraphosphite, 1,1,3-tris(2-methyl-4-di-tridecylphosphite-5-tert-butylphenyl)butane, 4,4'-butylidene bis(3-methyl-6-tert-butyl-di-tridecylphosphite), 2,2'-ethylidene bis(4,6-di-tert-butylphenol)fluorophosphite, 4,4'-isopropylidene-diphenolalkyl(C12 to C15)phosphite, cyclic neopentanetetrayl bis(2,4-di-tert-butylphenylphosphite), cyclic neopentanetetrayl bis(2,6-di-tert-butyl-4-phenylphosphite), cyclic neopentanetetrayl bis(nonylphenylphosphite), bis(nonylphenyl)pentaerythritol diphosphite, dibutyl hydrogenphosphite, distearyl pentaerythritol diphosphate and hydrogenated bisphenol A-pentaerythritol phosphite polymer, and 2-mercaptobenzimidazole.

A silane coupling agent may also be added in order to increase adhesion of the above block copolymer, rubber components such as natural rubber, and a filler and a reinforcing agent to improve mechanical strength. The silane coupling agent may be added when kneading the composition, or may be added in the course of a previous surface treatment of a filler or a reinforcing agent. Silane coupling agents may be used singly or in combinations of two or more. Examples thereof include, but are not limited to, bis-(3-triethoxysilylpropyl)tetrasulfide, bis-(3-trimethoxysilylpropyl)tetrasulfide, bis-(3-methyldimethoxysilylpropyl)tetrasulfide, bis-(2-triethoxysilylethyl)tetrasulfide, bis-(3-triethoxysilylpropyl)disulfide, bis-(3-trimethoxysilylpropyl)disulfide, bis-(3-triethoxysilylpropyl)trisulfide, 3-hexanoylthiopropyltriethoxysilane, 3-octanoylthiopropyltriethoxysilane, 3-decanoylthiopropyltriethoxysilane, 3-lauroylthiopropyltriethoxysilane, 2-hexanoylthioethyltriethoxysilane, 2-octanoylthioethyltriethoxysilane, 2-decanoylthioethyltriethoxysilane, 2-lauroylthioethyltriethoxysilane, 3-hexanoylthiopropyltrimethoxysilane, 3-octanoylthiopropyltrimethoxysilane, 3-decanoylthiopropyltrimethoxysilane, 3-lauroylthiopropyltrimethoxysilane, 2-hexanoylthioethyltrimethoxysilane, 2-octanoylthioethyltrimethoxysilane, 2-decanoylthioethyltrimethoxysilane, 2-lauroylthioethyltrimethoxysilane, 3-mercaptopropyltrimethoxysilane, 3-mercaptopropyltriethoxysilane, 3-mercaptopropylmethyldimethoxysilane, 3-aminopropyltrimethoxysilane, 3-aminopropyltriethoxysilane, γ-glycidoxypropyltrimethoxysilane, γ-glycidoxypropylmethyldiethoxysilane, 3-trimethoxysilylpropyl-N,N-dimethylthiocarbamoyl tetrasulfide, 3-trimethoxysilylpropyl benzothiazolyl tetrasulfide, 3-trimethoxysilylpropyl methacryloyl monosulfide, methyltrimethoxysilane, methyltriethoxysilane, dimethyldiethoxysilane, dimethyldimethoxysilane, trimethylethoxysilane, trimethylmethoxysilane, isobutyltrimethoxysilane, n-decyltrimethoxysilane, phenyltrimethoxysilane, phenyltriethoxysilane, diphenyldimethoxysilane, diphenyldiethoxysilane, hexyltrimethoxysilane, octadecylmethyldimethoxysilane, octadecyltrimethoxysilane, methyltrichlorosilane, dimethyldichlorosilane, triphenylchlorosilane, heptadecafluorodecylmethyldichlorosilane, heptadecafluorodecyltrichlorosilane and triethylchlorosilane.

The above rubber composition may be produced by using a known machine or apparatus by a routine method.

The method for producing a product containing the above composition is not particularly limited as long as the above composition is blended. The above composition may be directly used or may be used after vulcanization or vulcanization molding. As used herein, vulcanization molding means vulcanization after molding a composition, or vulcanization simultaneously with molding. An embodiment of the present invention also relates to a vulcanized product or a vulcanized molded article of the above composition.

<4. Product Including Composition>

A product according to an embodiment of the present invention includes the above composition, a vulcanized product or a vulcanized molded article thereof. The product of the present embodiment is preferably a rubber roll, a base isolation or vibration isolation part, a wiper blade and an automobile part, and these products include the above rubber composition, a vulcanized product or a vulcanized molded article thereof. Products including the above rubber composition, a vulcanized product or a vulcanized molded article thereof can achieve both flexibility and mechanical strength.

EXAMPLES

Hereinafter the present invention will be described in more detail with reference to Examples. Examples described below are typical instances of the present invention and the present invention is not limited to the following Examples.

<Number Average Molecular Weight Mn, Molecular Weight Distribution Mw/Mn>

The number average molecular weight Mn, the weight average molecular weight Mw, and the molecular weight distribution (Mw/Mn) of the polymer were measured with TOSOH HLC-8320GPC using THF as a solvent after adjusting the concentration of samples at 0.1% by mass with THF (in terms of standard polystyrene). Using TSK guard column HHR-H as a precolumn and three columns of HSK gel GMHHR-H as an analytical column, samples were eluted at a sample pump pressure of 8.0 to 9.5 MPa, a flow rate of 1 ml/minute at 40° C., and detected with a differential refractometer. For the time of elution and the molecular weight, a calibration curve prepared by measuring 9 standard polystyrene samples having a known molecular weight listed below was used.

Mw=$8.42 \times 10^6$, $1.09 \times 10^6$, $7.06 \times 10^5$, $4.27 \times 10^5$, $1.90 \times 10^5$, $9.64 \times 10^4$, $3.79 \times 10^4$, $1.74 \times 10^4$, $2.63 \times 10^3$.

<Polymerization Ratio>

The polymerization ratio from the start of polymerization to a certain time was calculated from the dry weight (solid concentration) obtained by heating and air-drying the latex (emulsion polymerization liquid) sampled. More specifically, the polymerization ratio was calculated by the following expression.

Polymerization ratio [%]={(Total amount fed [g]× solid concentration [% by mass]/100)−(evaporation residue [g])}/amount of monomer fed [g]× 100

In the expression, the solid concentration is the concentration (% by mass) of the solid, which is obtained by heating 2 g of a sampled latex at 130° C. to remove the solvent (water), volatile chemicals and raw materials, and removing the volatiles from the difference between the weight before and the weight after the heating. The dry weight during polymerization was determined after adding a polymerization inhibitor to the latex in an amount small enough not to affect the dry weight. The total amount fed and the evaporation residue were calculated based on polymerization formulation. The total amount fed refers to the total amount of raw materials, reagent and solvent (water) fed from the start of polymerization to a certain time. The evaporation residue represents the mass of chemicals and raw materials remaining in the form of a solid together with a polymer without being evaporated at 130° C. out of the chemicals and the raw materials fed from the start of polymerization to a certain time. The amount of monomers fed is the total amount of monomers fed at the initial stage and monomers added stepwise from the start of polymerization to a certain time. The polymerization ratio of the respective blocks of the copolymer was also calculated from the dry weight obtained by heating and air-drying the latex (emulsion polymerization liquid) sampled as described above. The mass of polymer prepared by polymerization of the previous blocks is also included in the evaporation residue. The amount of monomers fed is the total amount of monomers fed at the initial stage and monomers added stepwise from the start of polymerization to a certain time.

<Production of Di-Block Copolymer>

Example 1

Synthesis of 2-Ethylhexyl Acrylate Block

In a 500 ml three-neck separable flask, 0.47 g of sodium hydroxide, 0.5 g of naphthalenesulfonic acid-formalin condensate soda and 2.22 g of disproportionated tall rosin potassium salt were dissolved in 384 g of water, and deaeration was performed by nitrogen flow for 30 minutes while maintaining the mixture at 30° C. using an oil bath. Next, the above separable flask was charged with 5.00 g of 2-ethylhexyl acrylate monomer from which stabilizer was removed with an active alumina column and 0.12 g of benzyl 1-pyrrolecarbodithioate (also known as benzyl 1-pyrrole dithiocarbamate) (manufactured by Sigma Aldrich Japan) which had been dissolved therein, and the mixture was emulsified for 10 minutes using an oil bath at 30° C. The temperature of the resulting emulsion was increased to 70° C., and 3.84 g of a 2.00% by weight aqueous solution of 2,2'-azobis[2-(2-imidazolin-2-yl)propane] dihydrochloride (manufactured by Wako Pure Chemical Industries, Ltd.) was added thereto to initiate polymerization. After 8 hours, the temperature of the system was decreased to 25° C. or less to stop polymerization to give a poly(2-ethylhexyl acrylate) macropolymer latex. The polymerization conversion ratio of the 2-ethylhexyl acrylate monomer was calculated from the dry weight obtained by air-drying the 2-ethylhexyl acrylate macropolymer latex. Furthermore, the dried sample was used for GPC analysis.

Synthesis of Polychloroprene Block

Subsequently, 2.22 g of disproportionated tall rosin potassium salt was added to the above poly(2-ethylhexyl acrylate) macropolymer latex heated to 35° C., and then a mixture of 11.5 g of water, 95 g of chloroprene monomer and 0.15 g of sodium dodecylbenzenesulfonate was added stepwise thereto in 3 hours. Polymerization was performed until the polymerization conversion ratio of the chloroprene monomer reached 70%, and then a 10.00% by weight aqueous solution of N,N-diethylhydroxylamine was added thereto to stop the polymerization reaction. The chloroprene-2-ethylhexyl acrylate di-block copolymer latex was air-dried and the polymerization conversion ratio of the chloroprene monomer was calculated from the dry weight. Furthermore, the dried sample was used for GPC analysis.

(Dry-Up of Chloroprene-2-Ethylhexyl Acrylate Di-Block Copolymer)

The pH of the resulting chloroprene-2-ethylhexyl acrylate di-block copolymer latex was adjusted to pH 7.0, and the latex was demulsified by freezing and coagulating on a metal plate cooled to −20° C. The resulting sheet was washed with water and dried at 130° C. for 15 minutes to give a solid chloroprene-2-ethylhexyl acrylate di-block copolymer of Example 1. The chloroprene-2-ethylhexyl acrylate di-block copolymer was used for GPC analysis to measure the number average molecular weight (Mn) and the weight average molecular weight (Mw) of the whole di-block copolymer (the first block+the second block).

[Analysis of Functional Group Derived from RAFT Agent by 1H-NMR Measurement]

The functional group of the resulting block copolymer, which was derived from RAFT agent, was analyzed as follows. The resulting block copolymer was purified with benzene and methanol, and freeze-dried again to give a sample for measurement. 30 mg of the block copolymer was dissolved in 1 ml of deuterated chloroform, and 1H-NMR measurement was performed at 30° C. using ECX 400 (400 MHz) made by JEOL. A peak of a functional group derived from the RAFT agent (benzyl 1-pyrrolecarbodithioate) used was clearly observed. The structure of the functional group identified is shown in the following table. The same applies to the following Examples and Comparative Examples.

Example 2

A chloroprene-2-ethylhexyl acrylate di-block copolymer of Example 2 was prepared in the same manner as in Example 1 except for changing the amount of the 2-ethylhexyl acrylate monomer fed to 10 g and the amount of the chloroprene monomer fed to 90 g in Example 1.

Example 3

A chloroprene-2-ethylhexyl acrylate di-block copolymer of Example 3 was prepared in the same manner as in Example 1 except for changing the amount of the 2-ethylhexyl acrylate monomer fed to 15 g and the amount of the chloroprene monomer fed to 85 g in Example 1.

Example 4

A chloroprene-2-ethylhexyl acrylate di-block copolymer of Example 4 was prepared in the same manner as in Example 1 except for changing 0.12 g of benzyl 1-pyrrolecarbodithioate in Example 1 to 0.150 g of dibenzyl trithiocarbonate.

Comparative Example 1

A chloroprene-2-ethylhexyl acrylate di-block copolymer of Comparative Example 1 having a number average molecular weight of less than 110,000 was prepared in the same manner as in Example 3 except for changing the amount of benzyl 1-pyrrolecarbodithioate added from 0.12 g to 0.189 g and the amount of the 2.00% by weight aqueous solution of 2,2'-azobis[2-(2-imidazolin-2-yl)propane] dihydrochloride to 6.62 g.

Comparative Example 2

A chloroprene-2-ethylhexyl acrylate di-block copolymer of Comparative Example 2 in which the number average molecular weight of the block of a chloroprene polymer was less than 80,000 was prepared in the same manner as in Example 1 except for changing the amount of the 2-ethylhexyl acrylate monomer fed to 50 g and the amount of the chloroprene monomer fed to 50 g in Example 1.

The copolymers of Examples 1 to 3 and Comparative Examples 1, 2 are a di-block copolymer having a structure represented by the above formula (a) "A-B-A." The copolymer of Example 4 is a di-block copolymer having a structure represented by the above formula (e) "A-B-X-B-A."

Comparative Example 3

Synthesis of Chloroprene Polymer

In a 500 ml three-neck separable flask, 50 mg of sodium hydroxide, 1.0 g of naphthalenesulfonic acid-formalin condensate soda and 4.43 g of disproportionated tall rosin potassium salt were dissolved in 100 g of water, and deaeration was performed by nitrogen flow for 10 minutes while maintaining the mixture at 30° C. using an oil bath.

Next, the above separable flask was charged with 100 g of chloroprene monomer from which stabilizer was removed by vacuum distillation and 1.00 g of diethylxanthogen sulfide, and the mixture was emulsified for 10 minutes using an oil bath at 30° C. The temperature of the resulting emulsion was increased to 35° C., and a 2.00% by weight aqueous solution of potassium persulfate was added thereto, and polymerization was performed until the polymerization ratio reached 60%. A 10.00% by weight aqueous solution of N,N-diethylhydroxylamine was added thereto to stop the reaction, and the remaining chloroprene monomer was removed by vacuum distillation to give a chloroprene polymer latex.

(Dry-Up of Chloroprene Polymer)

The pH of the resulting chloroprene polymer latex was adjusted to pH 7.0, and the latex was demulsified by freezing and coagulating on a metal plate cooled to −20° C. The resulting sheet was washed with water and dried at 130° C. for 15 minutes to give a solid chloroprene polymer of Comparative Example 3. The chloroprene polymer was used for GPC analysis to measure the number average molecular weight (Mn) and the weight average molecular weight (Mw) of the chloroprene polymer.

Comparative Example 4

Synthesis of Chloroprene Polymer

In a 500 ml three-neck separable flask, 50 mg of sodium hydroxide, 1.0 g of naphthalenesulfonic acid-formalin condensate soda and 4.43 g of disproportionated tall rosin potassium salt were dissolved in 100 g of water, and deaeration was performed by nitrogen flow for 10 minutes while maintaining the mixture at 30° C. using an oil bath.

Next, the above separable flask was charged with 100 g of chloroprene monomer from which stabilizer was removed by vacuum distillation and 1.00 g of 1-dodecanethiol, and the mixture was emulsified for 10 minutes using an oil bath at 30° C. The temperature of the resulting emulsion was increased to 35° C., and a 2.00% by weight aqueous solution of potassium persulfate was added thereto, and polymerization was performed until the polymerization ratio reached 65%. A 10.00% by weight aqueous solution of N,N-diethylhydroxylamine was added thereto to stop the reaction, and the remaining chloroprene monomer was removed by vacuum distillation to give a chloroprene polymer latex. Furthermore, the dried sample was used for GPC analysis to measure the number average molecular weight (Mn) and the weight average molecular weight (Mw). As a result, the number average molecular weight (Mn) was $22.3 \times 10^4$ g/mol, the weight average molecular weight (Mw) was $63.4 \times 10^4$ g/mol, and the molecular weight distribution (Mw/Mn) was 2.84.

Synthesis of 2-Ethylhexyl Acrylate Polymer

In a 500 ml three-neck separable flask, 50 mg of sodium hydroxide, 1.0 g of naphthalenesulfonic acid-formalin condensate soda and 4.43 g of disproportionated tall rosin potassium salt were dissolved in 100 g of water, and deaeration was performed by nitrogen flow for 30 minutes while maintaining the mixture at 30° C. using an oil bath.

Next, the above separable flask was charged with 10 g of 2-ethylhexyl acrylate monomer from which stabilizer was removed with an active alumina column and 0.12 g of benzyl 1-pyrrolecarbodithioate (manufactured by Sigma Aldrich Japan), and the mixture was emulsified for 10 minutes using an oil bath at 30° C.

The temperature of the resulting emulsion was increased to 70° C., and 3.84 g of a 2.00% by weight aqueous solution of 2,2'-azobis[2-(2-imidazolin-2-yl)propane] dihydrochloride (manufactured by Wako Pure Chemical Industries, Ltd.) was added thereto to initiate polymerization. After 4 hours, the temperature of the system was decreased to 25° C. to stop polymerization to give a poly(2-ethylhexyl acrylate) macromonomer latex.

The polymerization conversion ratio of the 2-ethylhexyl acrylate monomer was calculated from the dry weight obtained by air-drying the poly(2-ethylhexyl acrylate) macropolymer latex. Furthermore, the dried sample was used for GPC analysis to measure the number average molecular weight (Mn) and the weight average molecular weight (Mw). As a result, the number average molecular weight (Mn) was $1.6 \times 10^4$ g/mol, the weight average molecular weight (Mw) was $1.8 \times 10^4$ g/mol, and the molecular weight distribution (Mw/Mn) was 1.15.

Preparation of Blend of Chloroprene Polymer and 2-Ethylhexyl Acrylate Polymer

The 2-ethylhexyl acrylate polymer in the form of latex was added to the resulting chloroprene polymer in the form of latex so that the solid content was 10 parts by mass based on a solid content of 90 parts by mass in the chloroprene polymer. The mixture was mixed for 60 minutes with stirring to give a latex of a blend of the chloroprene polymer and the 2-ethylhexyl acrylate polymer.

Dry-Up of Blend of Chloroprene Polymer and 2-Ethylhexyl Acrylate Polymer

The pH of the resulting latex of the blend of chloroprene polymer and 2-ethylhexyl acrylate polymer was adjusted to pH 7.0, and the latex was demulsified by freezing and coagulating on a metal plate cooled to −20° C. The resulting sheet was washed with water and dried at 130° C. for 15 minutes to give a solid blend of chloroprene polymer and 2-ethylhexyl acrylate polymer of Comparative Example 4.

<Production of Vulcanized Rubber>

100 parts by mass of the polymer of Examples 1 to 4 or Comparative Examples 1 to 4, 1 parts by mass of N-phenyl-1-naphthylamine, 30 parts by mass of carbon black (SRF; Asahi #50 manufactured by Asahi Carbon Co., Ltd.), 4 parts by mass of magnesium oxide (KYOWAMAG #150 manufactured by Kyowa Chemical Industry Co., Ltd.), 5 parts by mass of zinc oxide (manufactured by Sakai Chemical Industry Co., Ltd.) and 0.5 parts by mass of ethylene thiourea (Accel 22S manufactured by Kawaguchi Chemical Industry Co., Ltd.) were kneaded by using an 8 inch roll to give a rubber composition.

The rubber composition obtained was heat-treated using a heating press at 160° C. for 20 minutes to give vulcanized rubber.

<Evaluation of Properties of Vulcanized Rubber>

Flexibility of the above vulcanized rubber was measured according to JIS K6253 and those having a flexibility of 65 or less were regarded as pass. Furthermore, breaking strength and breaking elongation were measured according to JIS K6251. Those having a breaking strength of 15 MPa or more were regarded as pass. Those having a breaking elongation of 300% or more were regarded as pass.

The results of Examples 1 to 4 and Comparative Examples 1 to 4 are shown in the following Table 1. In Table 1, "EHA" means poly(2-ethylhexyl acrylate), "PCP" means polychloroprene, and "CP/EHA" means a blend of homopolychloroprene latex and homo-poly(2-ethylhexyl acrylate) latex.

TABLE 1

| | | | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| | Functional group (terminal structure) | | pyrrole-C(S)S~ | pyrrole-C(S)S~ | pyrrole-C(S)S~ | ~S-C(S)S~ | pyrrole-C(S)S~ | pyrrole-C(S)S~ | EtO-C(S)S~ | $C_{12}H_{25}S$~ |
| First block | Type of polymer | | EHA | EHA | EHA | EHA | EHA | EHA | PCP | CP/EHA |
| | Mn | $10^3$ g/mol | 7.2 | 15.2 | 22.2 | 7.4 | 15.2 | 73.2 | 20.6 | |
| | Mw/Mn | $10^3$ g/mol | 1.12 | 1.23 | 1.18 | 1.30 | 1.13 | 1.15 | 2.51 | |
| First block + second block | Type of polymer | | EHA + PCP | EHA + PCP | EHA + PCP | EHA + PCP | EHA + PCP | EHA + PCP | | |
| | Mn | $10^3$ g/mol | 150.4 | 127.3 | 120.2 | 170.4 | 96.3 | 151.3 | | |
| | Mw/Mn | $10^3$ g/mol | 1.76 | 1.62 | 1.53 | 1.84 | 1.94 | 1.78 | | |
| Second block alone | Mn | $10^3$ g/mol | 143.2 | 112.1 | 98.0 | 163.0 | 81.1 | 78.1 | | |
| Properties of rubber | Breaking strength | MPa | 21.5 | 18.3 | 15.6 | 19.2 | 13.6 | Processing impossible | 20.5 | 11.2 |
| | Breaking elongation | % | 430 | 380 | 320 | 390 | 210 | | 390 | 290 |
| | Hardness (Flexibility) | Shore A | 62 | 56 | 51 | 56 | 42 | | 71 | 57 |

As shown in Table 1, the vulcanized rubber containing the di-block copolymer of Examples 1 to 4 had excellent breaking strength, breaking elongation and flexibility.

Meanwhile, in Comparative Example 1, flexibility was comparable to that of Examples, but breaking strength and breaking elongation were poor. Furthermore, although the rubber containing the copolymer of Comparative Examples 3, 4 had breaking strength and breaking elongation comparable to those of Examples, their flexibility was poor. The rubber containing the di-block copolymer of Comparative Example 2 was extremely adhesive and could not be kneaded by the 8 inch roll.

Example 5

<Production of Tri-Block Copolymer>

(Synthesis of Poly(2-Ethylhexyl Acrylate) Block

A chloroprene-2-ethylhexyl acrylate di-block copolymer latex was synthesized in the same manner as in Example 1. 5.00 g of 2-ethylhexyl acrylate monomer from which stabilizer was removed with an active alumina column was added to the latex, and the mixture was emulsified for 10 minutes using an oil bath at 30° C. The temperature of the resulting emulsion was increased to 70° C., and 3.84 g of a 2.00% by weight aqueous solution of 2,2'-azobis[2-(2-imidazolin-2-yl)propane] dihydrochloride (manufactured by Wako Pure Chemical Industries, Ltd.) was added thereto to perform polymerization until the polymerization conversion ratio of 2-ethylhexyl acrylate monomer reached 100%, and then the system was cooled to 25° C. to stop polymerization. A block of poly(2-ethylhexyl acrylate) (third block) was synthesized by the above procedure.

The 2-ethylhexyl acrylate-chloroprene-2-ethylhexyl acrylate tri-block copolymer latex was air-dried and the polymerization conversion ratio of the 2-ethylhexyl acrylate monomer was calculated from the dry weight. Furthermore, the dried sample was used for GPC analysis to measure the number average molecular weight (Mn) and the weight average molecular weight (Mw) of the 2-ethylhexyl acrylate-chloroprene-2-ethylhexyl acrylate tri-block copolymer.

Dry-Up of 2-Ethylhexyl Acrylate-Chloroprene-2-Ethylhexyl Acrylate Tri-Block Copolymer The pH of the resulting 2-ethylhexyl acrylate-chloroprene-2-ethylhexyl acrylate tri-block copolymer latex was adjusted to pH 7.0, and the copolymer was demulsified by freezing and coagulating on a metal plate cooled to −20° C. The resulting sheet was washed with water and dried at 130° C. for 15 minutes to give a solid 2-ethylhexyl acrylate-chloroprene-2-ethylhexyl acrylate tri-block copolymer of Example 5.

The copolymer of Example 5 is a tri-block copolymer having a structure represented by the above formula (c) "A-B-A-X."

Vulcanized rubber was produced using the resulting tri-block copolymer of Example 5 in the same manner as described above, and evaluated. The results of Example 5 are shown in the following Table 2.

TABLE 2

| | | | Example 5 |
|---|---|---|---|
| | Functional group (terminal structure) | | pyrrole-C(S)S~ |
| First block | Type of polymer | | EHA |
| | Mn | $10^3$ g/mol | 7.3 |
| | Mw/Mn | $10^3$ g/mol | 1.12 |
| First block + second block | Type of polymer | | EHA + PCP |
| | Mn | $10^3$ g/mol | 150.6 |
| | Mw/Mn | $10^3$ g/mol | 1.82 |

TABLE 2-continued

| | | | Example 5 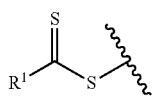 |
|---|---|---|---|
| | Functional group (terminal structure) | | |
| Second block alone | Mn | | 143.30 |
| First block + second block + Third block | Type of polymer<br>Mn<br>Mw/Mn | $10^3$ g/mol<br>$10^3$ g/mol | EHA + PCP + EHA<br>159.0<br>2.20 |
| Third block alone | Mn | | 8.40 |
| Properties of rubber | Breaking strength<br>Breaking elongation<br>Hardness (Flexibility) | MPa<br>%<br>Shore A | 19.4<br>410<br>56 |

As shown in Table 2, the rubber containing the tri-block copolymer of Example 5 had excellent flexibility, breaking strength and breaking elongation.

The following embodiments are also available in the present invention.

[1] A block copolymer comprising: one or more blocks of an acrylate polymer; and one or more blocks of a chloroprene polymer, wherein a number average molecular weight of the block copolymer is 110,000 or more, a number average molecular weight of the block of a chloroprene polymer is 80,000 or more in total, and the block copolymer has a functional group with a structure represented by the following chemical formula (1) or (2):

[Chem. 10]

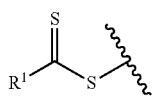  (1)

[Chem. 11]

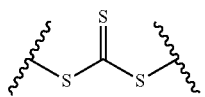  (2)

wherein in the chemical formula (1), $R^1$ represents hydrogen, chlorine, a substituted or unsubstituted alkyl group, a substituted or unsubstituted alkenyl group, a substituted or unsubstituted aryl group or a substituted or unsubstituted heterocyclyl group.

[2] The block copolymer according to [1], comprising a functional group with a structure represented by the following chemical formula (1) at an end:

[Chem. 12]

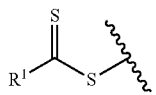  (1)

wherein in the chemical formula (1), $R^1$ represents hydrogen, chlorine, a substituted or unsubstituted alkyl group, a substituted or unsubstituted alkenyl group, a substituted or unsubstituted aryl group or a substituted or unsubstituted heterocyclyl group.

[3] The block copolymer according to [1] or [2], wherein the acrylate is at least one selected from the group consisting of methyl acrylate, ethyl acrylate, n-propyl acrylate, n-butyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate, n-octadecyl acrylate, 2-methoxyethyl acrylate, 2-ethoxyethyl acrylate, 2-(n-propoxy)ethyl acrylate, 2-(n-butoxy)ethyl acrylate, 3-methoxypropyl acrylate, 3-ethoxypropyl acrylate, 2-(n-propoxy)propyl acrylate and 2-(n-butoxy)propyl acrylate.

[4] The block copolymer according to [1] or [2], wherein the acrylate is alkyl acrylate having an alkyl group having 5 or more carbon atoms.

[5] A method for producing a block copolymer, the method comprising: performing radical emulsion polymerization of an acrylate alone, or an acrylate and another monomer in the presence of a RAFT agent to synthesize a block of an acrylate polymer; and then performing radical emulsion polymerization of chloroprene alone, or chloroprene and another monomer in a mixture to synthesize a block of a chloroprene polymer, wherein a number average molecular weight of the block copolymer is 110,000 or more and a number average molecular weight of the block of a chloroprene polymer is 80,000 or more in total.

[6] A method for producing a block copolymer, the method comprising: performing radical emulsion polymerization in the presence of a RAFT agent while adding chloroprene alone, or chloroprene and another monomer stepwise to synthesize a block of a chloroprene polymer; and then performing radical emulsion polymerization of an acrylate alone, or an acrylate and another monomer in a mixture to synthesize a block of an acrylate polymer, wherein a number average molecular weight of the block copolymer is 110,000 or more and a number average molecular weight of the block of a chloroprene polymer is 80,000 or more in total.

[7] The method for producing a block copolymer according to [5] or [6], wherein the RAFT agent is a RAFT agent represented by the following chemical formula (3) or (4):

[Chem. 13]

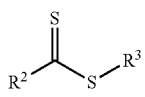  (3)

[Chem. 14]

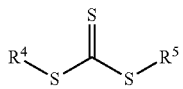  (4)

wherein in the chemical formula (3) $R^2$ represents hydrogen, chlorine, a substituted or unsubstituted alkyl group, a substituted or unsubstituted alkenyl group, a substituted or unsubstituted aryl group or a substituted or unsubstituted heterocyclyl group; and in the chemical formulas (3) and (4), $R^3$ to $R^5$ each independently represent a substituted or unsubstituted alkyl group, a substituted or unsubstituted, saturated or unsaturated, or aromatic carbocycle, a substituted or unsubstituted, saturated or unsaturated, or aromatic heterocycle, an organic metal species, or a polymer chain.

[8] A composition comprising the block copolymer according to any one of [1] to [4].

[9] The composition according to [8], wherein the composition is a rubber composition.

[10] A vulcanized product prepared by using the rubber composition according to [9].

[11] A vulcanized molded article prepared by using the rubber composition according to [9].

[12] A rubber roll, a base isolation or vibration isolation part, a wiper blade or an automobile part, prepared by using the vulcanized molded article according to [11].

The invention claimed is:

1. A method for producing a block copolymer, the method comprising: performing radical emulsion polymerization of an acrylate alone, or an acrylate and another monomer in the presence of a RAFT agent to synthesize a block of an acrylate polymer; and then performing radical emulsion polymerization of chloroprene alone, or chloroprene and another monomer in a mixture to synthesize a block of a chloroprene polymer, wherein a number average molecular weight of the block copolymer is 110,000 or more and a number average molecular weight of the block of a chloroprene polymer is 80,000 or more in total.

2. A method for producing a block copolymer, the method comprising: performing radical emulsion polymerization in the presence of a RAFT agent while adding chloroprene alone, or chloroprene and another monomer stepwise to synthesize a block of a chloroprene polymer; and then performing radical emulsion polymerization of an acrylate alone, or an acrylate and another monomer in a mixture to synthesize a block of an acrylate polymer, wherein a number average molecular weight of the block copolymer is 110,000 or more and a number average molecular weight of the block of a chloroprene polymer is 80,000 or more in total.

3. The method for producing a block copolymer according to claim 1, wherein the RAFT agent is a RAFT agent represented by the following chemical formula (3) or (4):

[Chemical Formula 3]

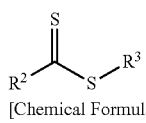

(3)

[Chemical Formula 4]

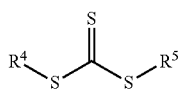

(4)

wherein in the chemical formula (3), $R^2$ represents hydrogen, chlorine, a substituted or unsubstituted alkyl group, a substituted or unsubstituted alkenyl group, a substituted or unsubstituted aryl group or a substituted or unsubstituted heterocyclyl group; and in the chemical formulas (3) and (4), $R^3$ to $R^5$ each independently represent a substituted or unsubstituted alkyl group, a substituted or unsubstituted, saturated or unsaturated, or aromatic carbocyclic, a substituted or unsubstituted, saturated or unsaturated, or aromatic heterocycle, an organic metal species, or a polymer chain.

4. A vulcanized product prepared from a rubber composition comprising a block copolymer, wherein the block copolymer comprises one or more blocks of an acrylate polymer and one or more blocks of a chloroprene polymer, wherein a number average molecular weight of the block copolymer is 110,000 or more, a number average molecular weight of the block of a chloroprene polymer is 80,000 or more in total, and the block copolymer has a functional group with a structure represented by the following Chemical Formula (1) or (2):

[Chemical Formula 1]

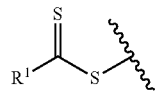

(1)

[Chemical Formula 2]

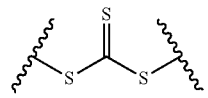

(2)

wherein, in Chemical Formula (1), $R^1$ represents hydrogen, chlorine, a substituted or unsubstituted alkyl group, a substituted or unsubstituted alkenyl group, a substituted or unsubstituted aryl group, or a substituted or unsubstituted heterocyclyl group.

5. The vulcanized product of claim 4, which is a molded article.

6. The molded article of claim 5, which is a rubber roll, a base isolation or vibration isolation part, a wiper blade, or an automobile part.

7. The vulcanized product of claim 4, wherein the block copolymer has a functional group with a structure represented by Chemical Formula 1.

8. The vulcanized product of claim 4, wherein the acrylate polymer is a polymer of at least one acrylate monomer selected from the group consisting of methyl acrylate, ethyl acrylate, n-propyl acrylate, n-butyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate, n-octadecyl acrylate, 2-methoxyethyl acrylate, 2-ethoxyethyl acrylate, 2-(n-propoxy)ethyl acrylate, 2-(n-butoxy)ethyl acrylate, 3-methoxypropyl acrylate, 3-ethoxypropyl acrylate, 2-(n-propoxy)propyl acrylate, and 2-(n-butoxy)propyl acrylate.

9. The vulcanized product of claim 4, wherein the acrylate polymer is a polymer of an alkyl acrylate monomer having an alkyl group having 5 or more carbon atoms.

* * * * *